United States Patent
Abdudeen et al.

(10) Patent No.: US 12,433,752 B1
(45) Date of Patent: Oct. 7, 2025

(54) PROSTHETIC HIP IMPLANT WITH IMPROVED LOAD DISTRIBUTION AND/OR JOINT STABILITY

(71) Applicant: United Arab Emirates University, Al Ain (AE)

(72) Inventors: Asarudheen Abdudeen, Al Ain (AE); Jaber Abu Qudeiri, Al Ain (AE); Ansar Kareem, Al Ain (AE); Alhuda M., Al Ain (AE)

(73) Assignee: United Arab Emirates University, Al Ain (AE)

( * ) Notice: Subject to any disclaimer, the term of this patent is extended or adjusted under 35 U.S.C. 154(b) by 0 days.

(21) Appl. No.: 19/010,895

(22) Filed: Jan. 6, 2025

(51) Int. Cl.
*A61F 2/32* (2006.01)
*A61F 2/34* (2006.01)
*A61F 2/36* (2006.01)

(52) U.S. Cl.
CPC .............. *A61F 2/3609* (2013.01); *A61F 2/32* (2013.01); *A61F 2/34* (2013.01); *A61F 2002/3611* (2013.01)

(58) Field of Classification Search
CPC ...... A61F 2/32; A61F 2/34; A61F 2/36; A61F 2/3609; A61F 2002/3611
See application file for complete search history.

(56) References Cited

U.S. PATENT DOCUMENTS 5,092,898 A * 3/1992 Bekki ................... A61F 2/3609
  623/22.16
11,672,666 B1 6/2023 Abu Qudeiri

FOREIGN PATENT DOCUMENTS

WO WO-9429605 A1 * 12/1994 ............... A61F 2/32

OTHER PUBLICATIONS

Houpert, Luc. (2015). Load-Displacement Relationships for Ball and Spherical Roller Bearings. Journal of Tribology. 137. 10.1115/1.4029042. (7 pages).
NTN Global. Ball and Roller Bearings Deep Groove Ball Bearings. https://www.ntnglobal.com/en/products/catalog/pdf/2203E_b02.pdf. (14 pages).

* cited by examiner

*Primary Examiner* — Dinah Baria
(74) *Attorney, Agent, or Firm* — Boyle Fredrickson, S.C.

(57) ABSTRACT

A prosthetic hip implant comprises a femoral component, an acetabular component, a liner, and ball bearings. The femoral component includes a stem for attachment to the patient's femur and a femoral head structure for articulation with a bearing surface. The acetabular component features a socket formation designed to receive the femoral head structure. The liner covers the exterior articulation surface of the socket formation, with one side in contact with the socket's exterior surface and the other side forming the bearing surface. Ball bearings are positioned between the femoral component and the bearing surface and are rotatably mounted within spaced parallel concentric grooves define in structure to transmit forces between the structure and the bearing surface.

5 Claims, 7 Drawing Sheets

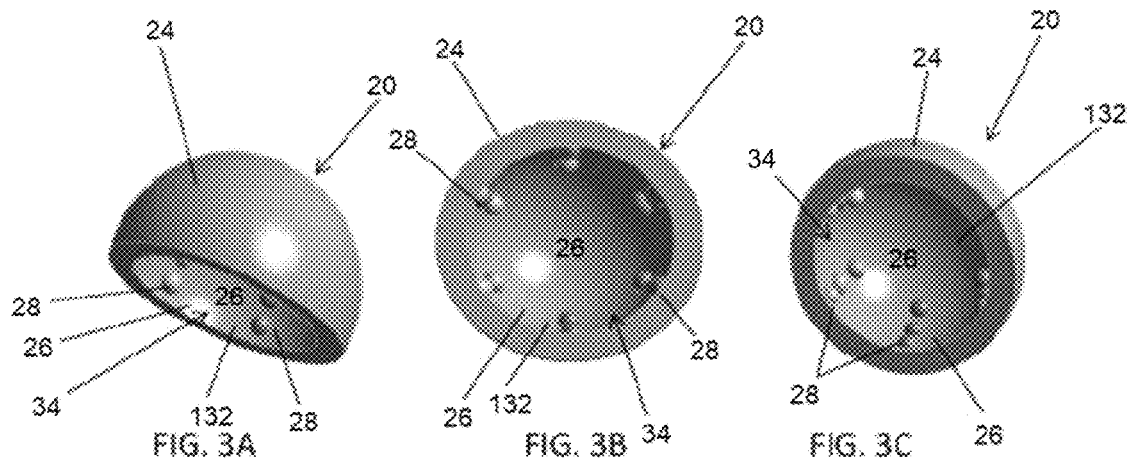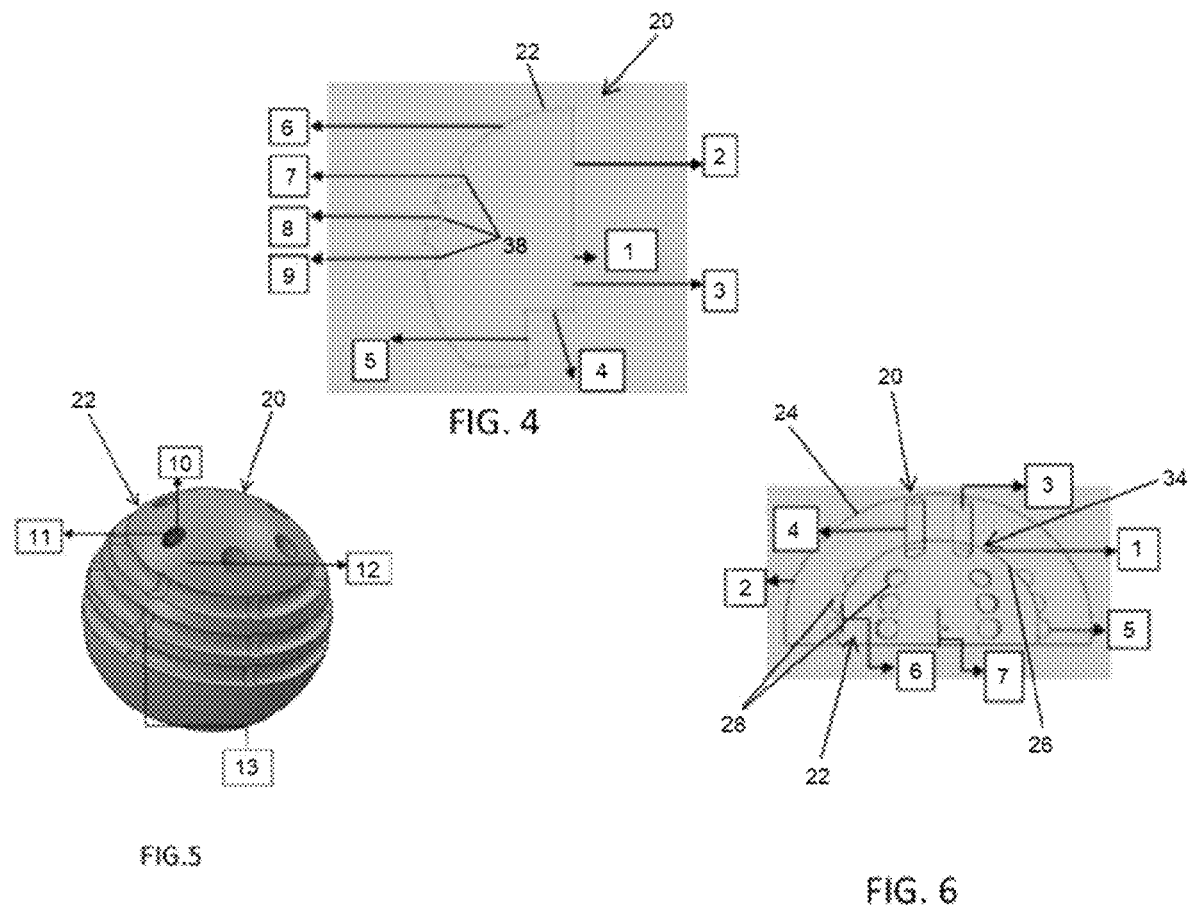

PROSTHETIC HIP IMPLANT WITH IMPROVED LOAD DISTRIBUTION AND/OR JOINT STABILITY

FIELD OF INVENTION

The invention relates to a prosthetic hip implant and more specifically to a prosthetic hip implant for joint replacement with improved load distribution and/or joint stability.

BACKGROUND TO INVENTION

The hip joint's functionality is crucial for mobility and quality of life, necessitating the development of reliable and durable hip implant systems. Hip joint replacement is an essential surgical procedure that restores function to diseased or damaged joints, particularly for individuals suffering from osteoarthritis and other degenerative diseases. More particularly, hip replacement surgery/hip arthroplasty is a surgical procedure for either partially or fully replacing the hip joint by a prosthetic hip implant. The procedure can either be performed as a total hip replacement or, alternatively, as a partial hip replacement (hemi-replacement).

In the case of a total hip replacement, damaged bone and cartilage is removed from the head of the femur bone and from the acetabular cup (also called "acetabulum") of the pelvis bone; and replaced with hip implants comprising a femoral prosthetic component (or femoral prosthesis) fitted to the proximal end of the femur bone and an acetabular prosthetic implant (or acetabular prosthesis) fitted to the lateral surface of the pelvis bone. The femoral prosthetic component (or femoral prosthesis) comprises a stem and a femoral head. The stem is inserted during the surgery into the medullary canal of a femur bone, either with, or without cement material. Via a process called osseointegration, over time, the stem of the femoral prosthesis gradually fuses with the femur bone, thereby enhancing the strength of connection between the femur bone and the femoral prosthesis.

Typically, a so-called "inner liner" is placed so as to line the inner articulating surface of the acetabular prosthetic implant to allow for smooth and reduced frictional movement of the head of the femoral prosthetic component when it moves relative to the prosthetic acetabular component.

Hip replacement surgeries have become increasingly common as a solution for degenerative joint diseases and trauma-related injuries. Over the years, various hip implant designs have been proposed, each attempting to balance factors such as durability, wear resistance, mechanical stability, and patient comfort.

Traditional hip implants often encounter challenges related to wear, fatigue, and biomechanical compatibility, despite significant progress made in their design and materials. Recent advancements in materials science and engineering have paved the way for innovative designs that enhance implant performance.

Over the years, the development of hip implants has significantly progressed, particularly with advancements in materials science and implant geometry. However, challenges persist in ensuring the long-term durability and effectiveness of hip implants, especially under high loading conditions. The design and material choice of hip implants significantly influence their performance, longevity, and ability to handle mechanical loads.

A major challenge with hip replacement surgery is the wear of hip implant components after implantation.

Conventional designs have primarily focused on reducing wear by utilizing materials such as metal-on-metal, ceramic-on-metal, or polyethylene-on-metal articulations. However, even with these advancements, several challenges persist, including excessive wear, stress concentrations, deformation under load, and ultimately, premature failure of the implant. Traditional implants predominantly utilized metals such as cobalt-chrome and titanium alloys due to their mechanical strength, durability, and biocompatibility. Nevertheless, challenges such as wear at the implant interface and stress shielding have prompted continuous innovation in implant design.

The design and material selection of hip implants are critical factors influencing their mechanical performance, longevity, and clinical success. Numerous studies have highlighted the significance of structural design in hip implants, emphasizing that optimizing implant geometry can markedly impact stress distribution and fatigue life.

Extensive research has been conducted on wear reduction in hip implants, with numerous studies highlighting the issue of wear particles, particularly in metal-on-metal implants. These wear particles can lead to aseptic loosening, inflammation, and implant failure. Literature, such as works by Qudeiri et al. (J. E. A. Qudeiri, A. Abdudeen, M. R. Sahadevan, Numerical investigation on the wear characteristics of hip implant under static loading, Heliyon (2024)) and Abdudeen et al. (A. Abdudeen, J. E. A. Qudeiri, A. Kareem, Groove Design Optimization of Femoral Heads in Solid Hip Implants: Study on Stress Distribution and Total Deformation using FEA and Full Factorial Design, Heliyon (n.d.)), discusses the impact of materials on the longevity of implants. Despite improvements in materials and surface finishes, many current designs still face issues with mechanical fatigue and wear.

Recent advancements in materials science, including the application of additive manufacturing, have allowed for the incorporation of intricate geometries, such as horizontal grooves in the femoral head. These grooves serve to improve lubrication and reduce frictional forces at the implant interface, thereby enhancing the longevity of the implant. The integration of horizontal grooves is particularly important as it helps mitigate localized stress concentrations that can lead to material fatigue and potential implant failure.

The role of liners in hip implants is equally significant, providing a smooth articulation between the femoral head and the acetabular cup, thereby reducing wear and friction. Ultra-high molecular weight polyethylene (UHMWPE) is the most commonly used material for liners, thanks to its excellent wear properties and biocompatibility.

The choice of materials for hip implants has undergone significant development over the years. Traditionally utilized materials include cobalt-chrome alloys, titanium alloys, and UHMWPE liners due to their superior wear resistance and mechanical properties. More recently, ceramic materials have gained traction for their low wear rates and biocompatibility in femoral heads. The use of polyethylene liners has also been found to effectively reduce friction between components, further improving implant performance.

In terms of geometrical modifications, surface enhancements, such as the addition of horizontal grooves in femoral heads, have emerged as notable innovations in hip implant design. These modifications aim to improve joint lubrication and enhance load distribution, thereby reducing localized stress concentrations that can lead to material fatigue and eventual implant failure.

Surface modifications can play a role in improving implant performance. Coatings that promote tissue growth and osseointegration can enhance implant stability and reduce the risk of implant loosening. Surface texturing techniques have also been explored to improve the implant's tribological performance, reducing implant wear and friction.

While previous designs have addressed certain individual aspects such as material wear or load distribution, there is no comprehensive solution that effectively addresses all the major challenges. Current designs often suffer from localized stress concentrations, resulting in deformation and wear that reduce the implant's overall lifespan.

SUMMARY OF INVENTION

According to one aspect of the invention, there is provided a prosthetic hip implant comprising:
a femoral prosthetic component including:
(a) a stem configured for connecting the femoral prosthetic component of the prosthetic hip implant to a femur bone of a patient.
(b) a femoral head structure connected to the stem and configured for articulation with a bearing surface for transmitting forces between said femur bone and said bearing surface; and
a plurality of ball bearings rotatably arranged between the femoral head structure and said baring surface for transmitting forces between the femoral head structure and said bearing surface.

In a particular embodiment, in use, the bearing surface may be constituted by an exterior articulation surface of a socket formation of an acetabular cup component, said socket formation being configured for receiving the femoral head structure of the prosthetic hip implant therein, the acetabular cup component configured for surgical fitment to a pelvic bone of a patient.

In another embodiment, the prosthetic hip implant may include an acetabular cup component configured for surgical fitment to a pelvic bone of a patient, the acetabular cup component defining a socket formation configured for receiving a femoral head structure of the femoral prosthetic component of the prosthetic hip implant therein, in an arrangement wherein said bearing surface may be constituted by an exterior articulation surface of the socket formation.

In another embodiment, the bearing surface may be constituted by a liner configured for lining an exterior articulation surface of a socket formation of an acetabular cup component, said socket formation being configured for receiving the femoral head structure of the prosthetic hip implant therein, the acetabular cup component configured for surgical fitment to a pelvic bone of a patient.

In yet another embodiment, the prosthetic hip implant may include an acetabular cup component configured for surgical fitment to a pelvic bone of a patient, the acetabular cup component defining a socket formation configured for receiving the femoral head structure of the femoral component of the prosthetic hip implant therein.

the prosthetic hip implant further including a liner configured for lining the socket formation, in an arrangement wherein a first major side of said liner is placed in contact with an exterior articulation surface of the socket formation, and wherein said bearing surface may be constituted by a second major side of said liner.

In a particular embodiment, said plurality of ball bearings may be rotatably mounted to the femoral head structure.

The femoral head structure may include one or more grooves defined along at least a portion of the femoral head structure.

As such, more specifically, said plurality of ball bearings may be rotatably mounted to the femoral head structure at locations disposed within said one or more grooves.

Said one or more grooves of the femoral head structure may more particularly include one or more concentric grooves which are spaced apart from one another and orientated parallel with respect to an equatorial region of the femoral head structure of the femoral component.

In another embodiment, said plurality of ball bearings may be rotatably mounted to the exterior articulation surface of the socket formation of the acetabular cup component. Alternatively, in another embodiment, the ball bearings may be rotatably mounted to the second major side of the liner.

Rotatable mounting of the plurality of ball bearings may be achieved by rotatably capturing each ball bearings within an associated ball bearing receiving formation configured for capturing the associated ball bearing therein, in an arrangement wherein the captured ball bearing can freely rotate therein, by cannot escape the associated ball bearing receiving formation within which it is captured.

The liner may be mad of Ultra-high molecular weight polyethylene. The ball bearings may be made of Ultra-high molecular weight polyethylene.

BRIEF DESCRIPTION OF DRAWINGS

Further features of the invention are described hereinafter by way of a non-limiting example of the invention, with reference to and as illustrated in the accompanying schematic drawings. In the drawings:

FIG. 3A shows a perspective view of another embodiment of a prosthetic hip implant in accordance with the invention, showing an acetabular cup component of the prosthetic hip including captured ball bearings;

FIG. 3B shows a bottom view of the acetabular cup component of FIG. 3A;

FIG. 3C shows a bottom perspective view of the acetabular cup component of FIG. 3A;

FIG. 4 shows a schematic sectional view of the femoral head structure of a femoral prosthetic component of a prosthetic hip implant of FIG. 1;

FIG. 5 shows a top perspective view of the femoral head structure of a femoral prosthetic component of a prosthetic hip implant of FIG. 1;

FIG. 6 shows a conceptual sectional view of the femoral head structure of FIG. 1 received within the acetabular cup of FIG. 3B;

DETAILED DESCRIPTION OF THE DRAWINGS

Figure 1:
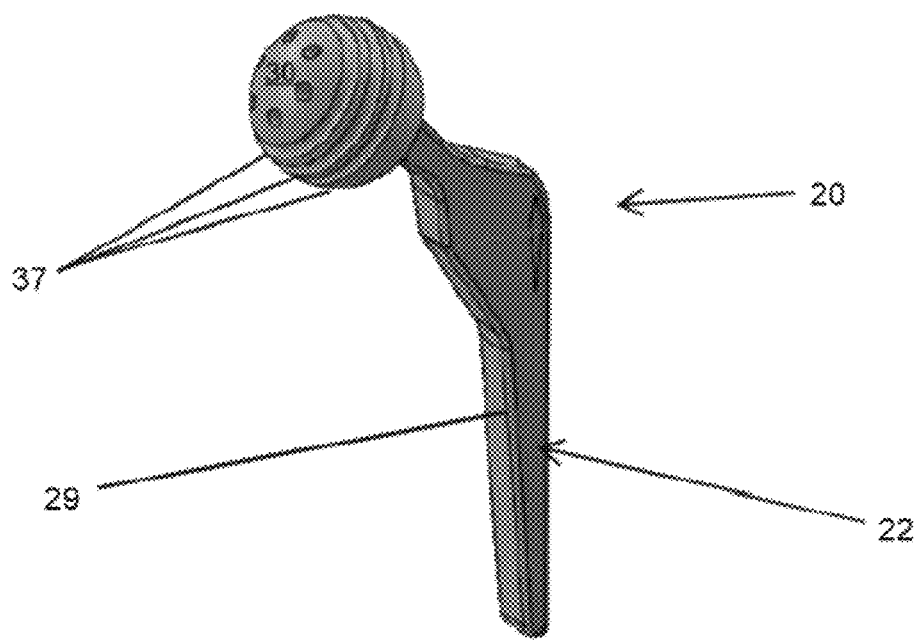
FIG. 1 shows a perspective view of a femoral head structure of a femoral prosthetic component of a prosthetic hip implant, in accordance with one aspect of the invention, shown with concentric grooves or so-called "horizontal grooves"

With reference to the drawings, a prosthetic hip implant in accordance with one aspect of the invention is designated generally by the reference numeral 20. The prosthetic hip implant 20 includes: a femoral prosthetic component 22; an acetabular cup component 24; a liner 26 and a plurality of ball bearings 28.

The femoral prosthetic component 22 includes a stem 29 configured for connecting the femoral prosthetic component 22 of the prosthetic hip implant 20 to a femur bone of a patient; and a femoral head structure 30 connected to the stem 29 and configured for articulation with a bearing surface 32, 132 for transmitting forces between said femur bone and said bearing surface 32, 132.

The acetabular cup component 24 is configured for surgical fitment to a pelvic bone of a patient, the acetabular cup component 24 defines a socket formation 34 configured for receiving the femoral head structure 30 of the femoral prosthetic component 22 of the prosthetic hip implant 20 therein.

In a particular embodiment, shown in FIG. 2 of the drawings, the socket formation 34 is configured for receiving the femoral head structure 30 of the femoral prosthetic component 22 of the prosthetic hip implant 20 therein, in an arrangement wherein said bearing surface 32 is constituted by an exterior articulation surface of the socket formation 34.

In another embodiment, shown in FIGS. 3A, 3B and 3C, the liner 26 is provided and the bearing surface 132 is constituted by the liner 26. The liner 26 is configured for lining an exterior articulation surface of the socket formation 34 of the acetabular cup component 24, said socket formation 34 being configured for receiving the femoral head structure 30 of the femoral component 22 of the prosthetic hip implant 20 therein, the acetabular cup component 24 being configured for surgical fitment to a pelvic bone of a patient.

More particularly, referring to FIGS. 3A, 3B and 3C, the liner 26 is configured for lining the socket formation 34, in an arrangement wherein a first major side of the liner 26 is placed in contact with an exterior articulation surface of the socket formation 34, and wherein the bearing surface 132 is constituted by a second major side of the liner 26. More specifically, the first major side of the liner 26 is bonded to the exterior articulation surface of the socket formation 34.

As shown in FIGS. 3A, 3B and 3C, the plurality of ball bearings 28 are rotatably arranged between the femoral prosthetic component 22 and said baring surface 132 for transmitting forces between the femoral head structure 30 and said bearing surface 132.

Figures 2A, 2B:
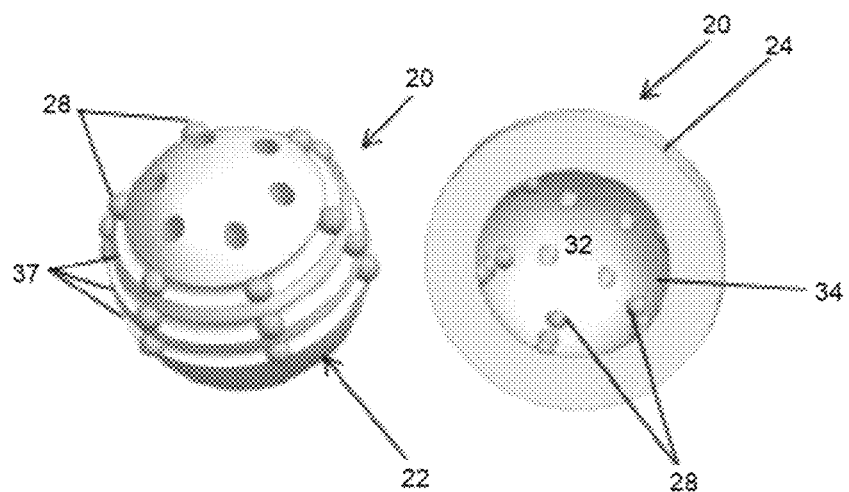
FIG. 2A shows the perspective view of the femoral head structure of FIG. 1, illustrated with ball bearings captured within the concentric grooves.
FIG. 2B shows the perspective view of another embodiment of a prosthetic hip implant in accordance with the invention, showing an acetabular cup component of the prosthetic hip implant illustrated with ball bearings captured therein.

In another embodiment shown in FIG. 2A, the plurality of ball bearings 28 are rotatably mounted to the femoral head structure 30 of the femoral prosthetic component 22.

The femoral head structure 30 includes one or more grooves 37 defined along at least a portion of the femoral head structure 30 as shown in FIG. 2A. As such, more specifically, the ball bearings 28 are rotatably mounted to the femoral head structure 30 at locations disposed within the grooves 37. The grooves 37 of the femoral prosthetic component 22 more particularly includes one or more concentric grooves 37 which are spaced apart from one another and orientated parallel with respect to an equatorial region of the femoral head structure 30.

In another embodiment, shown in FIGS. 2B, said plurality of ball bearings 28 are rotatably mounted to the exterior articulation surface of the socket formation 34 of the acetabular cup component 24.

In an alternative embodiment, the ball bearings 28 are rotatably mounted to the second major side of the liner, as shown in FIGS. 3A, 3B and 3C.

Rotatable mounting of the plurality of ball bearings 28 is achieved by rotatably capturing each ball bearing 28 within an associated ball bearing receiving formation 38 (shown in FIG. 4 of the drawings) and configured for capturing the associated ball bearing 28 therein, in an arrangement wherein the captured ball bearing 28 can freely rotate therein, by cannot escape the associated ball bearing receiving formation 38 within which it is captured.

The liners 26 are made of Ultra-high molecular weight polyethylene. The ball bearings 28 are made of Ultra-high molecular weight polyethylene.

The present inventors have advantageously found that the prosthetic hip implant 20 is highly advantageous since it incorporates an innovative combination of the liner 26 and ball bearings 28, along with the grooves 37 in the femoral head 30.

This combination offers improved mechanical performance, particularly under low to moderate load conditions, making it suitable for a wide range of clinical applications where structural stability and longevity are critical. The addition of ball bearings enhances load distribution and reduces localized stress, leading to better long-term durability of the implant.

More specifically, the inventors have advantageously found that the inclusion of ball bearings 28:

1. Integrated with horizontal grooves 37 in the femoral head structure 30 optimizes stress distribution across the joint interface, reducing deformation and enhancing overall stability.

2. Performance: The inclusion of ball bearings 28 between the liner 26 and femoral head structure 30 enables superior mechanical performance by distributing the load more evenly, minimizing wear and reducing shear stress. This innovative design provides enhanced resistance to deformation and mechanical fatigue, especially under low-load conditions, making it ideal for patients with moderate activity levels.

3. Advantages: The invention addresses key challenges in hip implant performance, such as reducing wear, minimizing energy loss, and optimizing stress distribution across the joint, which ultimately prolongs implant life and improves patient outcomes. Additionally, the combination of a liner 26 made of ultra-high-molecular-weight polyethylene (UHMWPE) with metallic or UHMWPE ball bearings 28 ensures both flexibility and strength in the design, further contributing to its durability.

The Comparative Study

The inventors have prepared a study investigating three configurations of hip implants, each utilizing different combinations of liners 26, ball bearings 28, and horizontal grooves 37, aiming to establish a comprehensive understanding of their mechanical behavior under physiological loads.

The present study focuses on the geometric optimization of hip implants, specifically investigating the effect of horizontal grooves on femoral head structures 30 (also referred to as "femoral heads"), the role of liners 26, and the incorporation of intermediate ball bearings 28 between components. The objective is to evaluate the comparative mechanical performance of three designs to determine the best-performing configuration, which may offer superior load capacity and reduce the risk of mechanical failure.

The configurations investigated include:
1. Case 1: A design without a liner 26, using acetabular cups and ball bearings 28, with horizontal grooves 37 in the femoral head.
2. Case 2: A design with a liner 26 but without ball bearings 28, featuring horizontal grooves 37 in the femoral head.
3. Case 3: A design with both a liner 26 and ball bearings 38, incorporating horizontal grooves in the femoral head.

The analysis is performed using finite element analysis (FEA), focusing on key performance indicators such as total deformation, maximum shear stress, strain energy, and principal stress. By examining these factors, this study aims to propose the optimal design for a hip implant that can withstand higher load-bearing conditions while minimizing the risks of mechanical failure. Design of solid femoral head with horizontal grooves is shown in FIG. 1 of the drawings.

1. Literature Review

Hip joint diseases like osteoarthritis and avascular necrosis have been increasing in prevalence worldwide, leading to the need for improved treatment options. Traditional hip implants have been successful in treating these diseases; however, they are not without limitations. Implant loosening, implant wear, and limited strength-to-weight ratios are among the issues that can arise with traditional implants.

To address these challenges, personalized hip implants using advanced design and additive manufacturing techniques have been proposed. These personalized implants can be designed to match the patient's unique anatomy and pathology, improving the implant's fit and reducing the likelihood of complications.

The design and material selection of hip implants are critical factors influencing their mechanical performance, longevity, and clinical success. Numerous studies have highlighted the significance of structural design in hip implants, emphasizing that optimizing implant geometry can markedly impact stress distribution and fatigue life. The evolution of hip implant design has witnessed substantial advancements since the early 20th century, driven by the need to enhance load distribution and minimize wear at the implant interface. Traditional implants predominantly utilized metals such as cobalt-chrome and titanium alloys due to their mechanical strength, durability, and biocompatibility. Nevertheless, challenges such as wear at the implant interface and stress shielding have prompted continuous innovation in implant design.

Recent advancements in materials science, including the application of additive manufacturing, have allowed for the incorporation of intricate geometries, such as horizontal grooves in the femoral head. These grooves serve to improve lubrication and reduce frictional forces at the implant interface, thereby enhancing the longevity of the implant. The integration of horizontal grooves is particularly important as it helps mitigate localized stress concentrations that can lead to material fatigue and potential implant failure.

The role of liners in hip implants is equally significant, providing a smooth articulation between the femoral head and the acetabular cup, thereby reducing wear and friction. Ultra-high molecular weight polyethylene (UHMWPE) is the most used material for liners, thanks to its excellent wear properties and biocompatibility. However, the decision to incorporate or exclude intermediate ball bearings between components, such as between the femoral head and the acetabular liner, adds complexity to the determination of overall implant performance. Liners are known to diminish wear and friction.

The choice of materials for hip implants has undergone significant development over the years. Traditionally utilized materials include cobalt-chrome alloys, titanium alloys, and UHMWPE liners due to their superior wear resistance and mechanical properties. More recently, ceramic materials have gained traction for their low wear rates and biocompatibility in femoral heads. The use of polyethylene liners has also been found to effectively reduce friction between components, further improving implant performance.

In terms of geometrical modifications, surface enhancements, such as the addition of horizontal grooves in femoral heads, have emerged as notable innovations in hip implant design. These modifications aim to improve joint lubrication and enhance load distribution, thereby reducing localized stress concentrations that can lead to material fatigue and eventual implant failure. However, the introduction of liners and intermediate components like ball bearings presents trade-offs that must be carefully evaluated. While liners facilitate smoother articulation and reduce wear, they also increase the implant's thickness and risk of displacement. Similarly, while ball bearings may enhance stress distribution and mobility, their inclusion complicates the implant design and introduces potential points of mechanical failure.

Surface modifications can play a role in improving implant performance. Coatings that promote tissue growth and osseointegration can enhance implant stability and reduce the risk of implant loosening. Surface texturing techniques have also been explored to improve the implant's tribological performance, reducing implant wear and friction.

The use of liners made of ultra-high molecular weight polyethylene (UHMWPE) materials is proposed to reduce wear and friction. The liners can be inserted between the femoral head and acetabular cup, while the smaller ball bearings can be placed in between the grooves made between the femoral head and acetabular cup or between the liner and femoral head and this is entirely a new concept that there are no experiments done before.

Numerical simulations have been used extensively to evaluate the performance of personalized hip implants. Finite element analysis (FEA) has been used to simulate the implant's response to different loading conditions and evaluate its structural integrity and stress distribution. This study builds on the insights garnered from the literature by comparing three variations of hip implant designs, systematically evaluating the trade-offs associated with liners, ball bearings, and horizontal grooves. Through finite element analysis (FEA), this research aims to provide a comprehensive understanding of the mechanical performance of these configurations under physiological loads, ultimately identifying the optimal design for enhanced implant longevity and effectiveness. Overall, the literature suggests that personalized hip implants utilizing advanced design techniques can yield improved treatment outcomes for patients suffering from hip joint diseases. Furthermore, the integration of numerical simulations can significantly aid in the optimization of implant design, while surface modifications, such as horizontal grooves, can further enhance implant performance and longevity.

2. Methodology 2.1 Materials and Geometric Setup

This study investigates three configurations of hip implants, each incorporating horizontal grooves in the femoral head to enhance their mechanical performance. The material properties were standardized across all configurations to ensure consistency and reliability in the comparative analysis. The materials used include titanium alloys for the metallic components and ultra-high-molecular-weight polyethylene (UHMWPE) for the liner. A comprehensive overview of the material properties and geometrical dimensions used in the simulations is summarized in Table 1.

TABLE 1

Overview of Material Properties and Implant Dimensions

| Material Property | Value |
| --- | --- |
| Young's Modulus | 200 GPa |
| Poisson's Ratio | 0.3 |
| Density | 7800 kg/m$^3$ |
| Femoral Head Diameter | 32 mm |
| Acetabular Cup Thickness | 8.2 mm |
| Liner Thickness | 4.5 mm |

The implants were designed to ensure that the centre of the femoral head aligns with the centre of the acetabular cup, facilitating accurate load transfer and biomechanical functionality.

2.2 Design Considerations

The three configurations analyzed in this study varied not only in terms of their mechanical performance but also in their structural designs. The acetabular cups and femoral heads in all three configurations were modelled as solid structures, allowing for direct comparisons under identical load conditions. However, the absence or presence of liners and ball bearings, along with the introduction of horizontal grooves, played a critical role in determining their overall performance.

3.2.1 Design of Acetabular Cups and Balls without Liners (Configuration 1)

Configuration 1 is characterized by an acetabular cup and femoral head with horizontal grooves and ball bearings, but without any liners. The solid structure design provides mechanical stability but, as the results demonstrate, suffers from high deformation, stress concentration, and strain energy. The grooves in the femoral head were intended to provide better load distribution, but the absence of a liner caused localized stress points, leading to high strain energy and principal stress. This design would likely wear out more quickly under repetitive loading conditions due to the concentration of forces at specific contact points between the femoral head and the acetabular cup.

3.2.2 Design of Acetabular Cups with Liners, No ball bearings (Configuration 2)

In Configuration 2, the acetabular cup is paired with a liner, but without the use of ball bearings between the femoral head and the liner. The liner introduces an additional layer of material that absorbs and distributes the load more effectively, leading to reduced deformation and stress. The horizontal grooves in the femoral head contribute to more efficient load distribution across the contact area with the liner. This configuration shows a marked improvement in mechanical performance, with significantly lower strain energy and shear stress compared to Configuration 1. This design is structurally more resilient and could lead to improved longevity in clinical applications.

3.2.3 Design of Acetabular Cups with Liners and Ball Bearings (Configuration 3)

Configuration 3, which includes both liners and ball bearings between the femoral head and the liner, presents the most advanced structural design. The ball bearings act as rolling elements that facilitate smoother load transfer between the femoral head and the liner, reducing friction and wear. The horizontal grooves, in conjunction with the ball bearings, allow for even more efficient stress distribution, as evidenced by the dramatically reduced principal stress and strain energy values. This design also demonstrated the lowest total deformation at 500 N force, indicating superior mechanical stability. Given these results, Configuration 3 stands out as the most durable and mechanically optimized design among the three configurations at lower loads. Table 2 shows the detailed dimension of parts of newly designed hip implant.

TABLE 2

Dimensions of newly designed components (a) Femoral head (b) Acetabular Cup (c) ball bearings.

| Part Name | Figure | Part Details | Dimensions (mm) |
| --- | --- | --- | --- |
| (a) Femoral head (Ti6Al4V) | See FIG. 4 Revolve using axis no: 2 See FIG. 5 | Diameter of the femoral head | 32 mm |
| | | Total height | 27.624 mm |
| | | Groove distance | 1.5 mm |
| | | 1. Centre point | 0 mm |
| | | 2. Line | 16 mm |
| | | 3. Line | 5.624 mm |
| | | 4. Line | 5 mm |
| | | 5. Line | 6 mm |
| | | 6. Circle | 16 mm (radius) |
| | | 7. Groove | 1.5 mm (radius) |
| | | 8. Groove | 1.5 mm (radius) |
| | | 9. Groove | 1.5 mm (radius) |
| | | 10. Cavity | (drawn by 8 mm side length hexagon) |
| | | 11. Cavity hole | 1.5 mm (radius) |
| | | 12. Cavity depth | 6 mm (From top) |
| | | 13. Engrave | 1.75 mm (radius) 360/6 degree for each groove |

Figure 7:
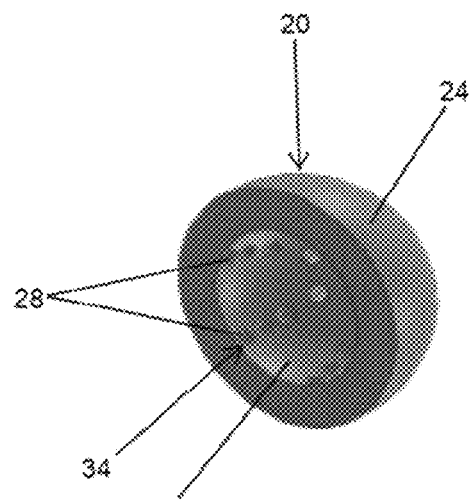
FIG. 7 shows a perspective view of the acetabular cup of FIG. 3C.
Figure 8:
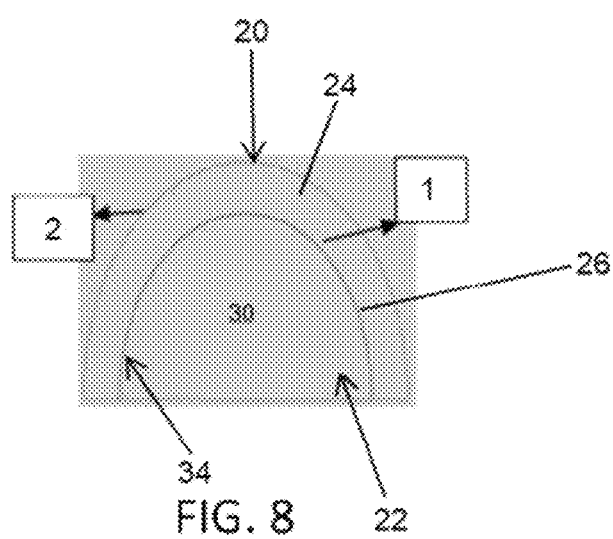
FIG. 8 shows a highly simplified cross-sectional view of FIG. 6.

| Part Name | Figure | Part Details | Dimensions (mm) |
|---|---|---|---|
| (b) Acetabular cup (Ti6Al4V) | See FIG. 6 See FIG. 7 Dimension of a liner (UHMWPE) is included. Having 1. Inner radius = 16 mm 2. Outer radius = 20.57 mm See FIG. 8. | Total height 1. Inner radius 2. Outer radius (Screw hole is drawn from top view with a square side of 12 mm) 3. Screw hole radius 4. Screw hole depth 5. Engrave 6. Engrave distance 7. Extension | 27.2 mm 16 mm 24.2 mm 1.5 mm 8.2 mm 1.75 mm (radius) 360/6 degree 4.5 mm (radius) For each from centre 3 mm (radius) For covering horizontal groove on femoral head with ball |

Figure 9:
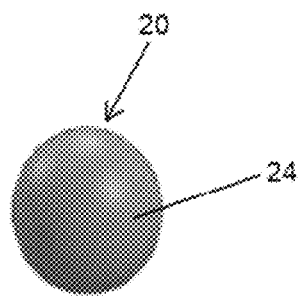
FIG. 9 shows a bottom view of the acetabular cup of FIG. 7.

| FIGURE | DRAWING | SKETCH | DIMENSION (mm) |
|---|---|---|---|
| (c) Femoral ball (UHMWPE) | See FIG. 9 | 1. Ball radius | 1.70 mm |

2.3 Finite Element Analysis (FEA)

Finite element analysis was conducted using ANSYS software. The study employed static load tests to assess the performance of the implant designs under forces ranging from 500 N to 2500 N, with increments of 400 N. This range of loading conditions is representative of the physiological stresses experienced by hip implants during daily activities.

For each implant configuration, the following mechanical parameters were evaluated:

Total Deformation (mm): This parameter measures the overall displacement of the implant in response to applied loads, providing insight into its structural integrity and potential for yielding or failure.

Maximum Shear Stress (MPa): The highest internal shear stress within the implant structure is critical for understanding the material's resistance to shearing forces, which can lead to mechanical failure.

Strain Energy (mJ): This parameter quantifies the energy absorbed by the implant due to deformation, reflecting its ability to withstand repeated loading without permanent deformation.

Maximum Principal Stress (MPa): The highest tensile stress within the implant is crucial for assessing the likelihood of material failure, particularly in regions subjected to concentrated loads.

Each model underwent systematic loading conditions, simulating the variable forces that hip implants encounter in vivo. By applying the same range of forces across all three configurations, the study ensured that the results were directly comparable.

3. Results and Discussion

The finite element analysis results reveal significant differences in mechanical performance across the three hip implant configurations. The performance metrics evaluated were total deformation, maximum shear stress, strain energy, and principal stress. These metrics provide a comprehensive understanding of each configuration's ability to withstand physiological loads and potential clinical outcomes.

Figure 10:
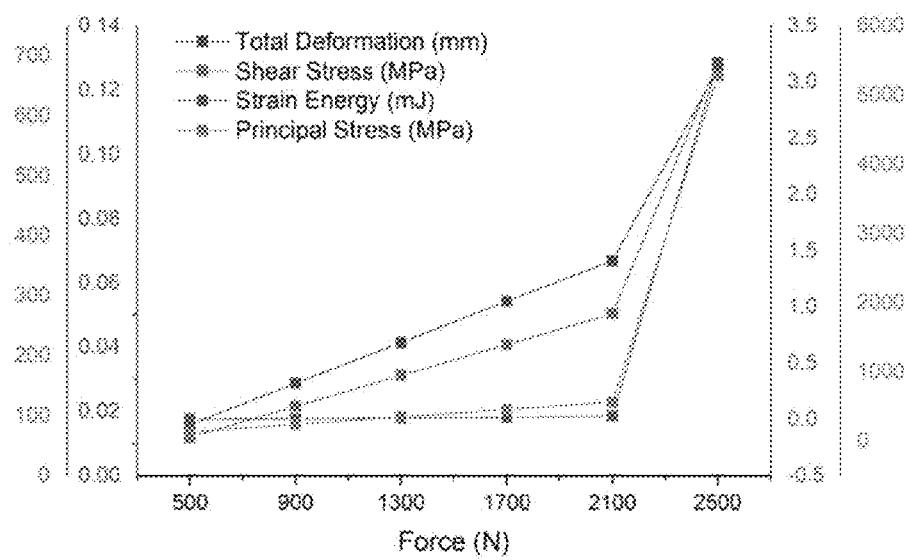
FIG. 10 shows a graph showing finite element analysis results of mechanical performance of Case 1 comprising a prosthetic hip implant comprising no liner, but with ball bearings and horizontal grooves.

Case 1: Without Liner, with Acetabular Cups and ball bearings, Horizontal Grooves (FIG. 10)

| Force (N) | Total Deformation (mm) | Shear Stress (MPa) | Strain Energy (mJ) | Principal Stress (MPa) |
|---|---|---|---|---|
| 500 | 0.0159 | 64.18 | 0.00167 | 134.19 |
| 900 | 0.0287 | 115.52 | 0.00542 | 241.55 |
| 1300 | 0.0414 | 166.86 | 0.0113 | 348.90 |
| 1700 | 0.0542 | 218.20 | 0.0193 | 456.25 |
| 2100 | 0.0669 | 269.54 | 0.0295 | 563.61 |
| 2500 | 0.1265 | 688.49 | 3.1686 | 5278.39 |
| 2300 | 0.1280 | 688.81 | 3.1684 | 5280.46 |

Figure 11:
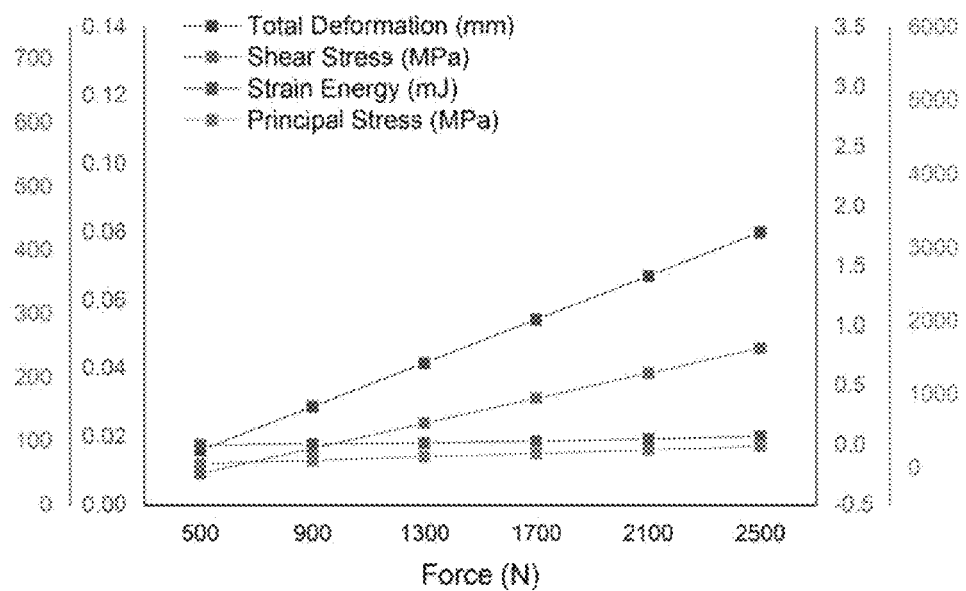
FIG. 11 shows a graph showing finite element analysis results of mechanical performance of Case 2 comprising a prior art prosthetic hip implant comprising a liner, no ball bearings and with horizontal grooves.

Case 2: With Liner, Without ball bearings, Horizontal Grooves (FIG. 11)

| Force (N) | Total Deformation (mm) | Shear Stress (MPa) | Strain Energy (mJ) | Principal Stress (MPa) |
|---|---|---|---|---|
| 500 | 0.0160 | 49.31 | 0.00297 | 59.40 |
| 900 | 0.0288 | 88.77 | 0.00961 | 106.91 |
| 1300 | 0.0416 | 128.22 | 0.0200 | 154.43 |
| 1700 | 0.0544 | 167.67 | 0.0343 | 201.95 |
| 2100 | 0.0672 | 207.12 | 0.0523 | 249.47 |
| 2500 | 0.0800 | 246.57 | 0.0741 | 296.98 |

Figure 12:
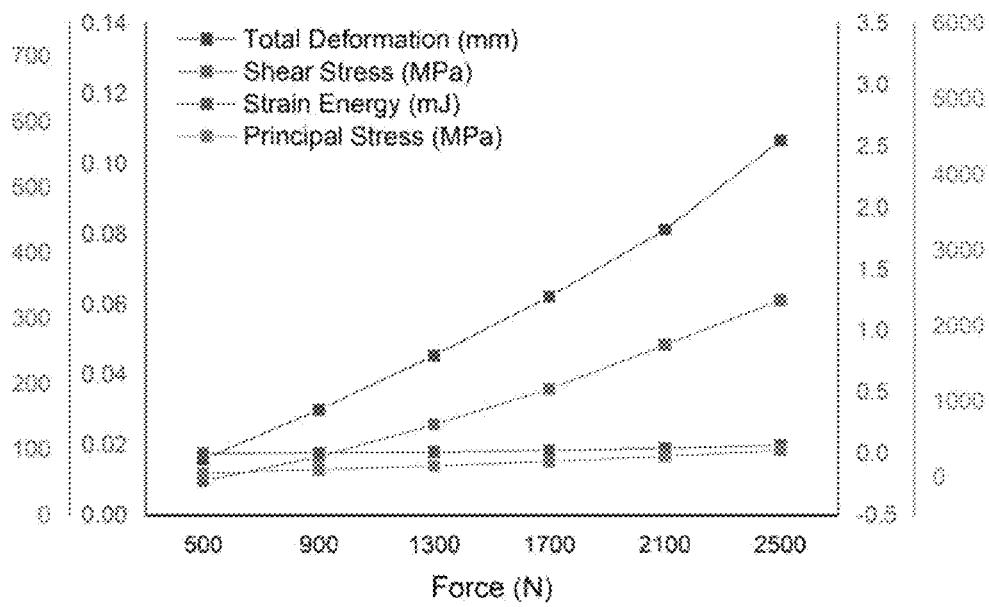
FIG. 12 shows a graph showing finite element analysis results of mechanical performance of Case 3 comprising a prosthetic hip implant, in accordance with the invention, comprising a liner, ball bearings and with horizontal grooves.

Case 3: With Liner, With ball bearings, Horizontal Grooves (FIG. 12)

| Force (N) | Total Deformation (mm) | Shear Stress (MPa) | Strain Energy (mJ) | Principal Stress (MPa) |
|---|---|---|---|---|
| 500 | 0.0160 | 52.31 | 0.00253 | 58.40 |
| 900 | 0.0301 | 89.76 | 0.00901 | 108.12 |
| 1300 | 0.0455 | 138.54 | 0.0172 | 154.85 |
| 1700 | 0.0624 | 192.87 | 0.0288 | 213.35 |
| 2100 | 0.0814 | 260.12 | 0.0469 | 284.51 |
| 2500 | 0.1068 | 328.76 | 0.0721 | 360.68 |

4.1 Detailed Comparison and Analysis of Case 1, 2 and 3.
4.1.1. Total Deformation Case 1 showed lower deformation across all forces until it reached 2500 N, where it showed a significant increase to 0.1265 mm.

Case 2 demonstrated the most consistent and moderate deformation, never exceeding 0.0800 mm.

Case 3 exhibited increasing deformation with force, reaching 0.1068 mm at 2500 N.

Conclusion: Case 2 is the best in terms of deformation, as it maintains the lowest values throughout the range of forces applied.

4.1.2. Maximum Shear Stress

Case 1 has a sharp rise in shear stress, peaking at 688 MPa at 2300 N.

Case 2 performs better, with a peak shear stress of 246 MPa at 2500 N.

Case 3 shows an intermediate performance, with 328 MPa at 2500 N.

Conclusion: Case 2 shows the best performance under shear stress conditions, with values that are lower compared to both other cases.

4.1.3. Strain Energy

Case 1 experiences a significant jump in strain energy at higher forces, reaching over 3.168 mJ at 2300 N.

Case 2 maintains very low strain energy levels, peaking at 0.0741 mJ.

Case 3 shows higher strain energy than Case 2 but remains well below Case 1.

Conclusion: Case 2 is the most efficient in terms of strain energy absorption, showing the lowest levels.

4.1.4. Maximum Principal Stress

Case 1 shows a dramatic increase in principal stress, reaching over 5280 MPa at 2300 N.

Case 2 performs better, peaking at 296 MPa at 2500 N.

Case 3 is intermediate, with 360 MPa at 2500 N.

Conclusion: Case 2 is again the best-performing design in terms of maximum principal stress.

4.2 Comparison of 4 Parameters Individually in Each Case

4.2.1 Total Deformation

Total deformation measures how much the implant bends or compresses under applied loads. The results for the three configurations are as follows:

| Force (N) | Case 1: Without Liner (mm) | Case 2: With Liner, No ball bearings (mm) | Case 3: With Liner, With ball bearings (mm) |
|---|---|---|---|
| 500 | 0.0159 | 0.0160 | 0.0160 |
| 900 | 0.0287 | 0.0288 | 0.0301 |
| 1300 | 0.0414 | 0.0416 | 0.0455 |
| 1700 | 0.0542 | 0.0544 | 0.0624 |
| 2100 | 0.0669 | 0.0672 | 0.0814 |
| 2500 | 0.1265 | 0.0800 | 0.1068 |

Analysis:

Case 1 showed significant deformation at higher loads, particularly at 2500 N, where it deformed by 0.1265 mm.

Case 2 maintained a lower and more consistent deformation profile across the force range, with a maximum deformation of 0.0800 mm at 2500 N.

Case 3 experienced higher deformation than Case 2 but less than Case 1.

Conclusion: Case 2 demonstrates the least deformation, suggesting that the liner significantly reduces the overall structural deformation of the implant

4.2.2 Maximum Shear Stress

Maximum shear stress indicates the highest stress levels encountered within the implant structure due to applied forces.

| Force (N) | Case 1: Without Liner (MPa) | Case 2: With Liner, No ball bearings (MPa) | Case 3: With Liner, With ball bearings (MPa) |
|---|---|---|---|
| 500 | 64.18 | 49.31 | 52.31 |
| 900 | 115.52 | 88.77 | 89.76 |
| 1300 | 166.86 | 128.22 | 138.54 |
| 1700 | 218.20 | 167.67 | 192.87 |
| 2100 | 269.54 | 207.12 | 260.12 |
| 2500 | 688.49 | 246.57 | 328.76 |

Analysis:

Case 1 showed the highest shear stress values, particularly a spike at 2500 N (688.49 MPa).

Case 2 demonstrated significantly lower shear stress, peaking at 246.57 MPa at 2500 N.

Case 3 fell in between the two, peaking at 328.76 MPa at 2500 N.

Conclusion: Case 2 outperforms the other configurations in terms of shear stress reduction, making it the most favourable design for minimizing internal stresses

4.2.3 Strain Energy

Strain energy measures the amount of energy absorbed by the implant under deformation.

| Force (N) | Case 1: Without Liner (mJ) | Case 2: With Liner, No ball bearings (mJ) | Case 3: With Liner, With ball bearings (mJ) |
|---|---|---|---|
| 500 | 0.00167 | 0.00297 | 0.00253 |
| 900 | 0.00542 | 0.00961 | 0.00901 |
| 1300 | 0.0113 | 0.0200 | 0.0172 |
| 1700 | 0.0193 | 0.0343 | 0.0288 |
| 2100 | 0.0295 | 0.0523 | 0.0469 |
| 2500 | 3.1686 | 0.0741 | 0.0721 |

Analysis:

Case 1 experiences a significant spike in strain energy at higher loads, suggesting higher energy absorption but also greater deformation potential.

Case 2 consistently shows lower strain energy across the load range, with only 0.0741 mJ at 2500 N.

Case 3 falls slightly below Case 2 but is still well below the strain energy of Case 1.

Conclusion: Case 2 demonstrates superior energy efficiency, absorbing less energy than both other cases.

4.2.4 Maximum Principal Stress

Principal stress is a measure of the tensile stress within the implant.

| Force (N) | Case 1: Without Liner (MPa) | Case 2: With Liner, No ball bearings (MPa) | Case 3: With Liner, With ball bearings (MPa) |
|---|---|---|---|
| 500 | 134.19 | 59.40 | 58.40 |
| 900 | 241.55 | 106.91 | 108.12 |
| 1300 | 348.90 | 154.43 | 154.85 |
| 1700 | 456.25 | 201.95 | 213.35 |
| 2100 | 563.61 | 249.47 | 284.51 |
| 2500 | 5278.39 | 296.98 | 360.68 |

Analysis:

Case 1 exhibited a sharp increase in principal stress, reaching over 5278 MPa at 2500 N.

Case 2 showed a maximum principal stress of 296.98 MPa at 2500 N, a drastic reduction compared to Case 1.

Case 3 reached a maximum principal stress of 360.68 MPa at 2500 N.

Conclusion: Case 2 shows the most favourable results in terms of reducing tensile stress, with a much lower value than the other configurations.

4.3 Mechanical Performance Metrics

Figure 16:
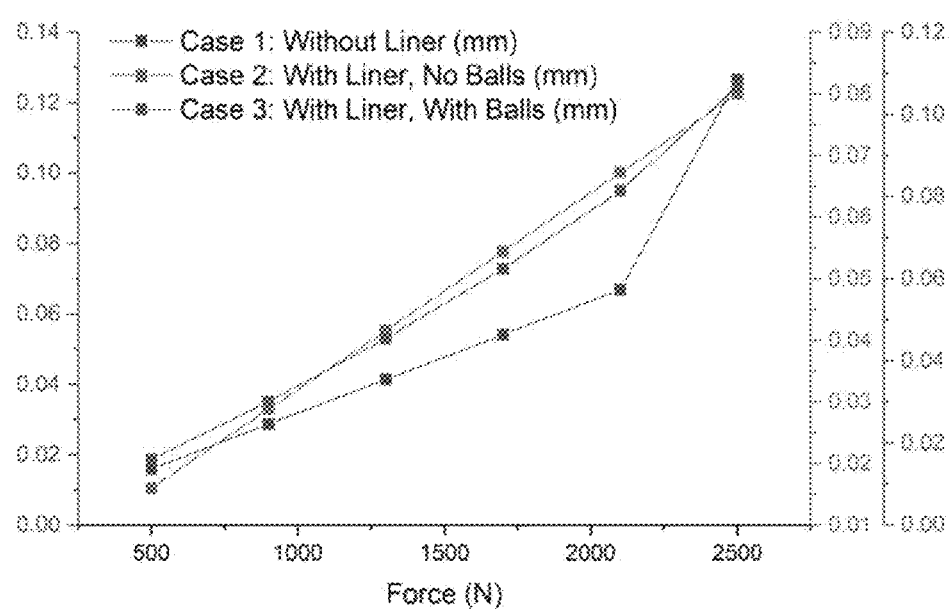
FIG. 16 shows a graph showing Total Deformation (mm) v Force (N) for case 1, case 2 and case 3.

4.3.1 Total Deformation (FIG. 16)

Total deformation is a critical indicator of how much an implant distorts under applied load, influencing its long-term stability and performance. In the analysis, the configuration without liners (Configuration 1: acetabular cups and ball bearings) exhibited the highest deformation. For instance, under a force magnitude of 2500 N, the total deformation for this configuration was recorded at 0.1265 mm. On the other hand, the configuration with liners but no ball bearings (Configuration 2: with liner, without ball bearings) demonstrated a significantly lower deformation at 0.0800 mm under the same loading condition. The introduction of ball bearings in the liner-femoral head interface (Configuration 3) also reduced the deformation, making this the stable design closer to configuration 2.

The deformation reduction in Configuration 2 compared to Configuration 1 is a remarkable 36.7%, indicating that the inclusion of liners and ball bearings provides additional structural support and restricts excessive deformation, potentially enhancing implant longevity and load-bearing capacity. These results align with the hypothesis that liners and the ball interface reduce mechanical instability by distributing load more evenly.

The total deformation results highlight significant differences among the three configurations.
Without Liner: 0.1265 mm
With Liner: 0.0800 mm
Percentage Improvement:

$$\text{Improvement} = \left(\frac{0.1265 - 0.0800}{0.1265}\right) * 100 = 36.7\%$$

Figure 14:
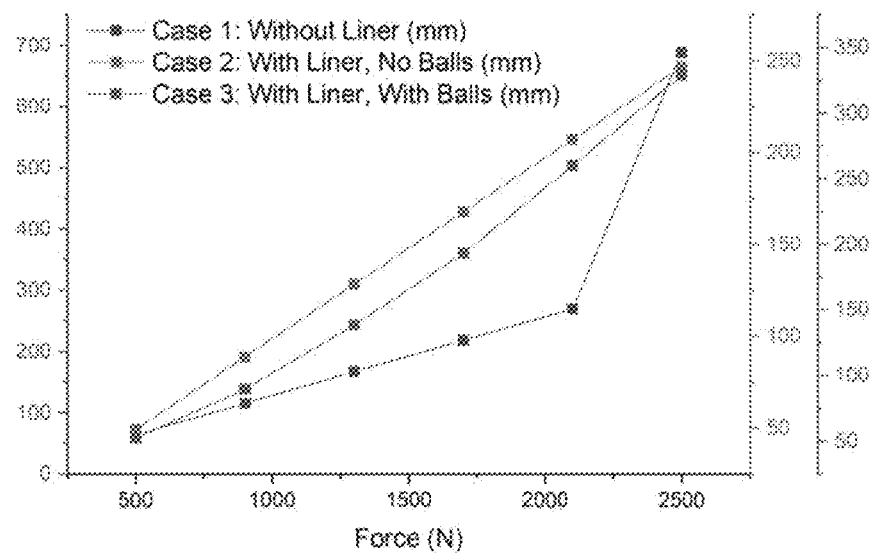
FIG. 14 shows a graph showing Maximum Shear Stress (Mpa) v Force (N) for Case 1, Case 2 and Case 3.

4.3.1 Maximum Shear Stress (FIG. 14)

Shear stress is a vital measure of how internal forces within the implant material are distributed, which in turn affects its durability and wear resistance. The maximum shear stress observed in Configuration 1, which lacked a liner and ball bearings, was 688.49 MPa under a load of 2500 N. This high level of stress indicates that the material in this configuration is subjected to significant internal forces, which could lead to earlier material failure or wear in clinical applications. In contrast, Configuration 2, which introduced a liner but omitted the ball bearings, showed a much lower shear stress of 246.57 MPa, a 64.2% reduction compared to the first configuration.

Configuration 3, which includes both liners and ball bearings, demonstrated the lowest shear stress closer to configuration 2 at 328.76 MPa. This considerable reduction suggests that the combined use of liners and ball bearings substantially mitigates stress concentrations in the implant, thereby reducing the risk of fatigue and wear over time. These findings highlight the importance of using a liner and ball interface in hip implant design to ensure reduced mechanical strain and enhanced implant life.

The maximum shear stress values indicate that the configuration with liners demonstrates lower stress concentrations.
Without Liner: 688.49 MPa
With Liner: 246.57 MPa
Percentage Reduction:

$$\text{Reduction} = \left(\frac{688.49 - 246.57}{688.49}\right) * 100 = 64.2\%$$

Figure 15:
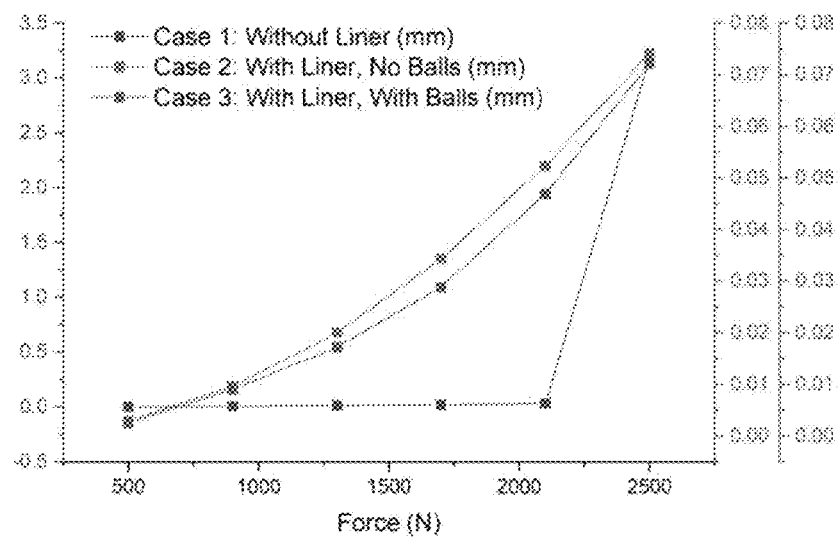
FIG. 15 shows a graph showing Maximum Strain Energy (mJ) v Force (N) for Case 1, Case 2 and Case 3.

4.3.2 Maximum Strain Energy (FIG. 15)

Strain energy represents the energy stored in a material due to deformation, and excessive strain energy can indicate areas susceptible to failure. Configuration 1 exhibited the highest strain energy, with a value of 3.1686 mJ under a 2500 N load. This high strain energy suggests that the implant material is undergoing significant elastic deformation, which could lead to micro-cracks and eventual failure, especially in load-bearing scenarios.

In comparison, Configuration 2 showed a dramatic reduction in strain energy to 0.0741 mJ, a 97.6% reduction. The inclusion of a liner in this design allowed for more efficient load distribution, reducing the elastic deformation experienced by the material. Configuration 3 maintained similarly low levels of strain energy at 0.0721 mJ, confirming that the liner and ball interface considerably enhances the implant's ability to absorb energy without experiencing significant deformation. These results strongly advocate for the use of liners and ball bearings in hip implants to improve overall material resilience.

The strain energy reflects the ability of the material to absorb energy without permanent deformation.
Without Liner: 3.1686 mJ
With Liner: 0.0741 mJ
Percentage Reduction:

$$\text{Reduction} = \left(\frac{3.1686 - 0.0741}{3.1686}\right) * 100 = 97.6\%$$

Figure 13:
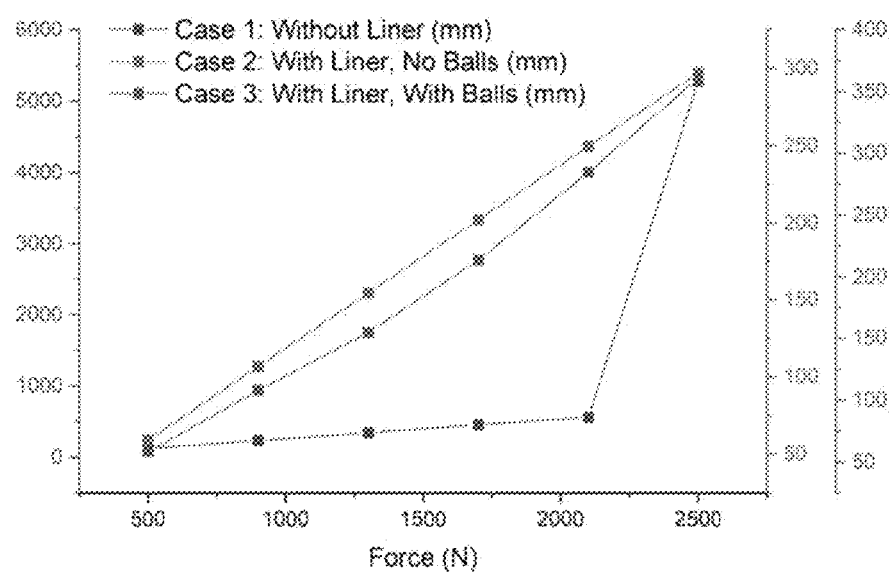
FIG. 13 shows a graph showing Maximum Principal Stress (Mpa) v Force (N) for Case 1, Case 2 and Case 3.

4.3.3 Maximum Principal Stress (FIG. 13)

The maximum principal stress is crucial for understanding the directional stress experienced by the implant material. Excessive principal stress can lead to crack initiation and eventual failure under repeated loading conditions. In Configuration 1, the principal stress reached a peak value of 5278.39 MPa, a clear indication that this configuration is subjected to high levels of directional stress, which could lead to mechanical failure over time.

However, with the introduction of a liner in Configuration 2, the principal stress dropped significantly to 296.98 MPa, representing a 94.4% reduction in stress concentration. This reduction can be attributed to the liner's ability to distribute load more evenly, thereby reducing the stress experienced by the implant material. Configuration 3, which incorporated both liners and ball bearings, achieved a closer reduction with configuration 2 in principal stress to 360.68 MPa, indicating the configuration's ability to withstand high loads while minimizing stress concentrations.

The maximum principal stress results indicate that configurations with liners better withstand applied forces.
Without Liner: 5278.39 MPa
With Liner: 296.98 MPa
Percentage Reduction:

$$\text{Reduction} = \left(\frac{5278.39 - 296.98}{5278.39)}\right) * 100 = 94.4\%$$

The analysis clearly indicates that the configuration with liners and ball bearings provides substantial improvements in total deformation, shear stress, strain energy, and principal stress. This configuration reduces stress concentrations, enhancing the longevity and reliability of hip implants.

4. Conclusion

The comparative analysis of the three hip implant designs reveals that Case 2 (with liner, without ball bearings, and with horizontal grooves) stands out as the most optimal design for high-load-bearing applications. It consistently demonstrates superior performance across all key mechanical parameters, including reduced deformation, lower shear stress, minimized strain energy, and optimal principal stress distribution. This design's exclusion of ball bearings, while retaining a liner, significantly improves the structural stability of the implant, allowing for more even load distribution. The liner, made of Ultra High Molecular Weight Polyethylene (UHMWPE), further enhances the implant's wear resistance and longevity, making it particularly suited for long-term use in high-stress environments. The uniform stress distribution and reduced energy absorption in this configuration ensure minimal risk of long-term implant failure, thereby improving the patient's overall clinical outcome. Based on these advantages, Case 2 is highly recommended as the optimal design for hip implants.

However, Case 3 (with liner and ball bearings, with horizontal grooves) also shows promising performance, particularly under low-load conditions, and its results are quite close to those of Case 2. The incorporation of ball bearings between the femoral head and liner in this design contributes to improved mechanical stability at lower loads, providing better performance in scenarios where the applied force is less intense. The ball bearings, also made of UHMWPE, play a key role in absorbing initial shocks and distributing load, which can be beneficial in situations requiring flexibility and less rigidity in the structure. While Case 2 is recommended for high-load-bearing applications, Case 3 offers a robust alternative for low-load scenarios, where its design elements may provide additional benefits in terms of cushioning and adaptability. Both designs exhibit a balance of durability and performance, making them highly competitive candidates for innovation in hip implant technology.

5. Scope

This study provides critical knowledge into the performance and optimization of hip implant designs, particularly focusing on configurations with and without liners and ball bearings. The findings extend the current understanding of how design features such as the presence of horizontal grooves, liners, and ball bearings impact the mechanical stability, stress distribution, and deformation of hip implants. The scope of this research has broad clinical implications, particularly in customizing implants to suit varying patient load conditions.

While Case 2 (with liner, without ball bearings, and horizontal grooves) is recommended for high-load applications due to its superior mechanical performance, Case 3 (with liner, ball bearings, and horizontal grooves) also shows promise in specific clinical scenarios, especially in patients with lower load-bearing requirements. The detailed comparison across parameters such as total deformation, shear stress, and strain energy provides a clear direction for optimizing hip implants for diverse patient needs.

The potential for further research and development in refining these designs to enhance long-term clinical outcomes is vast. The findings can be extended to improve implant longevity, reduce failure rates, and enhance patient comfort, making this study a foundational contribution to the field of orthopaedic implant design and engineering. Moreover, the insights from this research can serve as a springboard for future innovations, such as the use of advanced materials like ceramics, and further design adjustments that enhance performance under variable loading conditions.

Discussion of Advantages of Combination of Liners 26, Ball Bearings 28 and Horizontal Grooves 37

The inventors have advantageously found that the combination of liners, ball bearings and horizontal grooves on the femoral head structure 30 of the femoral component is advantageous as set out below.

More specifically, the combination of liners, ball bearings and horizontal grooves on the head of the femoral structure sets the arrangement apart from existing hip implant designs, offering novel solutions to long-standing challenges in the field of orthopedic implants.

The primary distinguishing features include:

1. Incorporation of ball bearings Between the Liner and Femoral Head: Unlike conventional designs that place liners directly between the femoral head and acetabular cup, this invention introduces multiple spherical components (ball bearings) between the liner and the femoral head. This innovative placement significantly improves load distribution by creating a rolling contact interface, which minimizes wear and deformation. It also enhances joint stability across a broader range of motion, especially during low-load conditions, reducing micro-movements and improving patient comfort. Furthermore, the use of ball bearings has been found to reduce points of mechanical failure.

2. Combination of Liners and Horizontal Grooves: The femoral head in this design features horizontal grooves, a concept that improves lubrication and reduces friction at the interface. These grooves serve as channels for synovial fluid, ensuring better lubrication and reducing the wear rate. While horizontal grooves have been explored previously in metal-on-metal systems, their combination with UHMWPE liners and ball bearings is entirely novel. This pairing reduces friction, wear, and stress on the implant's surface while maintaining a high degree of structural integrity.

3. Hybrid Design with UHMWPE Liners and Metallic/UHMWPE ball bearings: The hybrid approach of using UHMWPE liners with metallic or UHMWPE ball bearings allows the implant to benefit from the flexibility and wear resistance of polymer materials while still taking advantage of the strength and durability of metals or Polymers. This unique material combination is designed to withstand both high-load and low-load conditions while providing excellent wear resistance and reducing the generation of wear particles, a common issue in traditional metal-on-metal implants.

4. Superior Load Distribution and Stress Reduction: The inclusion of ball bearings between the liner and femoral head creates multiple contact points that distribute load evenly across the joint. This design prevents stress concentrations and minimizes total deformation, ensuring greater durability and longevity of the implant. By distributing stress more efficiently, this implant reduces the risk of failure, making it suitable for a wider range of patients, especially those with higher activity levels.

5. Optimized for Both High-Load and Low-Load Performance: Traditional hip implants are often optimized for either high-load or low-load performance, but rarely both. This design, by leveraging the advantages of both liners and ball bearings, offers enhanced stability and mechanical performance across a range of load conditions. Under high loads, the liner absorbs the stress, while under low loads, the ball bearings improve mobility and reduce friction. This dual capability makes the implant highly versatile for different patient needs and physical conditions.

6. Non-Obvious Combination of Known Concepts: While liners and grooved surfaces are known concepts in implant design, the specific combination and placement in this invention is novel and non-obvious. The strategic positioning of ball bearings between the liner and femoral head, coupled with the integration of horizontal grooves, creates a mechanical synergy that greatly enhances performance.

7. Potential for Customization: The modular nature of the design allows for potential customization based on patient-specific needs. The number, material, and size of the ball bearings, as well as the depth and pattern of the horizontal grooves, can be tailored to different load-bearing requirements or anatomical variations, offering personalized solutions that further enhance the performance of the implant.

Furthermore, no existing design combines a liner and ball bearings with horizontal grooves to optimize both high-load and low-load performance. This invention offers a novel configuration that addresses these issues by:

1. Introducing ball bearings between the liner and the femoral head, improving load distribution and minimizing stress concentrations at the joint interface.
2. Integrating horizontal grooves in the femoral head, enhancing lubrication and further reducing wear, while optimizing stress distribution across the joint.
3. Utilizing UHMWPE liners with metallic or UHMWPE ball bearings, combining the flexibility of polymers with the strength and wear resistance of metals/polymers, offering superior performance across a wide range of load conditions.

Unsolved Problems and advantages of the invention:

1. Localized Stress and Deformation: In conventional designs, high-stress concentrations often lead to deformation and material fatigue, reducing implant longevity. The present invention solves this by using ball bearings between the liner and femoral head, which distribute the load more evenly and reduce the risk of deformation, especially under higher loads.
2. Wear and Friction: Metal-on-metal and metal-on-polyethylene designs have been known to generate wear particles that can lead to inflammation and aseptic loosening. By incorporating horizontal grooves for better fluid lubrication and UHMWPE liners, this design reduces friction and wear, extending the implant's service life.
3. Stability under Low Loads: Traditional hip implants perform well under high loads but often lack stability under low-load conditions, which can be detrimental to patient mobility. The inclusion of ball bearings in the design enhances stability under low loads, providing a more reliable and consistent performance in everyday activities Advantages This hip implant design in accordance with the invention offers several significant advantages over existing technologies. The introduction of ball bearings between the liner and femoral head greatly improves load distribution and joint stability, ensuring a more even stress profile across the implant and reducing localized wear. The integration of horizontal grooves in the femoral head facilitates better lubrication, minimizing friction and extending the lifespan of the implant.

By using UHMWPE liners in combination with metallic or UHMWPE ball bearings, the design benefits from both the flexibility of polymer materials and the strength of harder materials, enhancing durability and reducing the risk of wear particles being released into the body. The implant is also customizable, allowing for adjustments based on patient-specific anatomical requirements, making it highly versatile for a range of clinical applications.

The exact configuration of the prosthetic hip implant 20, in accordance with the invention, may vary greatly while still incorporating the essential features of the invention as described hereinabove.

The invention claimed is:

1. A prosthetic hip implant comprising:
    a femoral prosthetic component including:
        (a) a stem configured for connecting the femoral prosthetic component of the prosthetic hip implant to a femur bone of a patient;
        (b) a femoral head structure connected to the stem and configured for articulation with a bearing surface for transmitting forces between said femur bone and said bearing surface, wherein the femoral head structure includes concentric grooves which are defined at least around a portion of the femoral head structure and which are spaced apart from one another and orientated parallel with respect to an equatorial region of the femoral head structure; and
    a plurality of ball bearings rotatably arranged between the femoral head structure and said bearing surface for transmitting forces between the femoral head structure and said bearing surface, wherein the plurality of ball bearings are rotatably mounted within said concentric grooves.

2. The prosthetic hip implant as claimed in claim 1, wherein the prosthetic hip implant further includes an acetabular cup component configured for surgical fitment to a pelvic bone of a patient, the acetabular cup component defining a socket formation configured for receiving the femoral head structure of the femoral prosthetic component of the prosthetic hip implant therein, in an arrangement wherein said bearing surface is constituted by an exterior articulation surface of the socket formation.

3. The prosthetic hip implant as claimed in claim 1, wherein the prosthetic hip implant includes an acetabular cup component configured for surgical fitment to a pelvic bone of a patient, the acetabular cup component defining a socket formation configured for receiving the femoral head structure of the femoral component of the prosthetic hip implant therein;
    the prosthetic hip implant further including a liner configured for lining the socket formation, in an arrangement wherein a first major side of said liner is placed in contact with an exterior articulation surface of the socket formation, and wherein said bearing surface is constituted by a second major side of said liner.

4. The prosthetic hip implant as claimed in claim 3, wherein the liner is made of Ultra-high molecular weight polyethylene.

5. The prosthetic hip implant as claimed in claim 1, wherein the ball bearings are made of Ultra-high molecular weight polyethylene.

* * * * *